Dec. 20, 1932.  G. H. BRODERICK  1,891,367
PAPER BOX MAKING MACHINERY
Filed Nov. 1, 1930  8 Sheets-Sheet 3

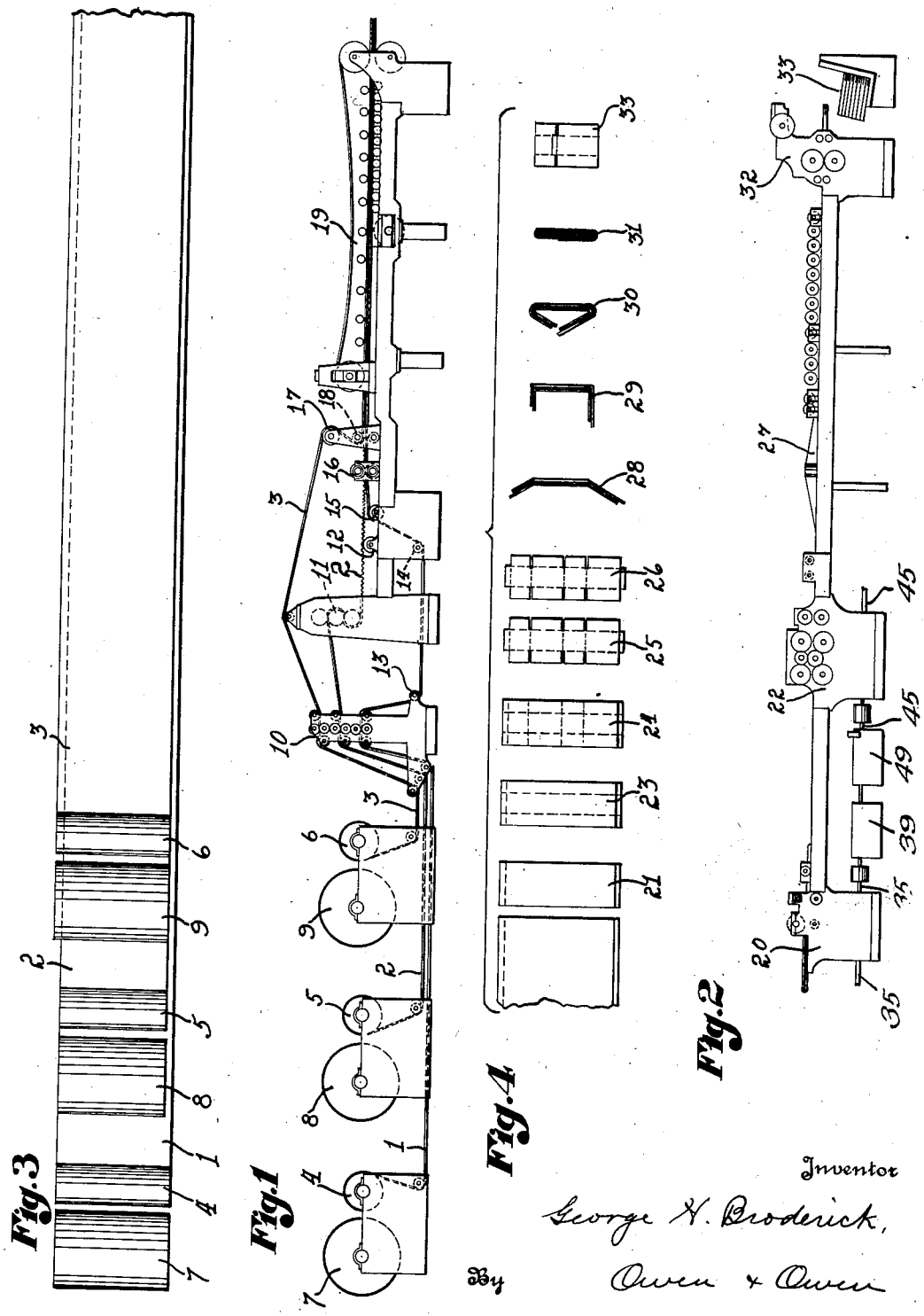

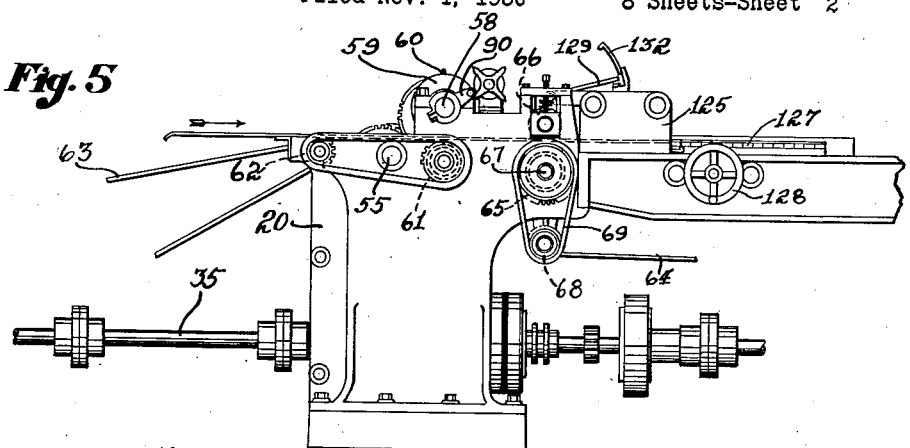
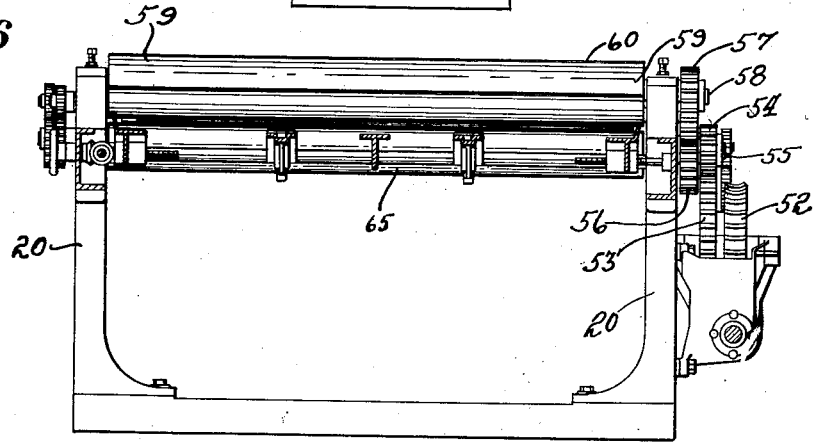
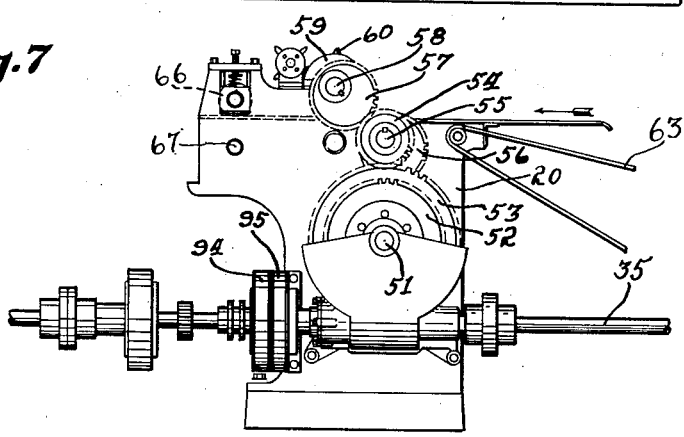

Inventor
George H. Broderick,
By Owen & Owen
Attorneys

Dec. 20, 1932.  G. H. BRODERICK  1,891,367
PAPER BOX MAKING MACHINERY
Filed Nov. 1, 1930  8 Sheets-Sheet 4

Inventor
George H. Broderick
By Owen & Owen
Attorneys

Dec. 20, 1932.  G. H. BRODERICK  1,891,367
PAPER BOX MAKING MACHINERY
Filed Nov. 1, 1930  8 Sheets-Sheet 5

Inventor
George H. Broderick
Owen & Owen
Attorneys

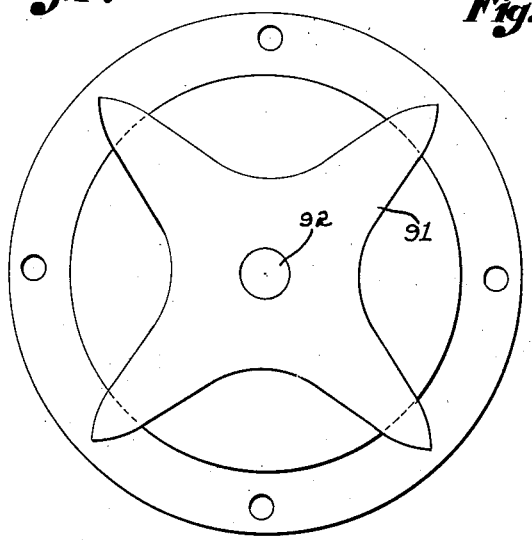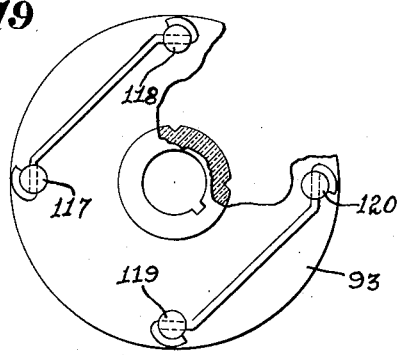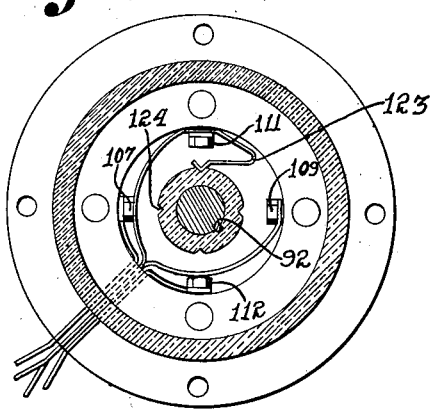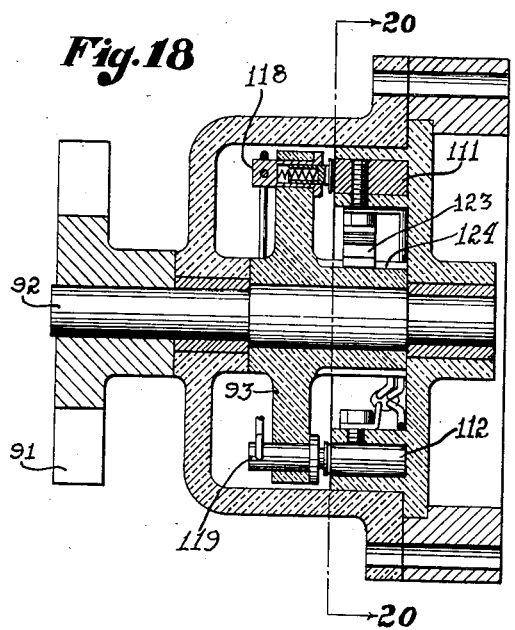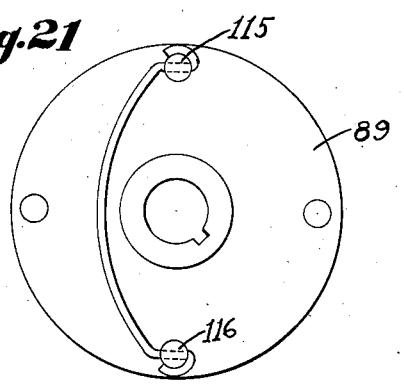

Dec. 20, 1932.  G. H. BRODERICK  1,891,367
PAPER BOX MAKING MACHINERY
Filed Nov. 1, 1930   8 Sheets-Sheet 8
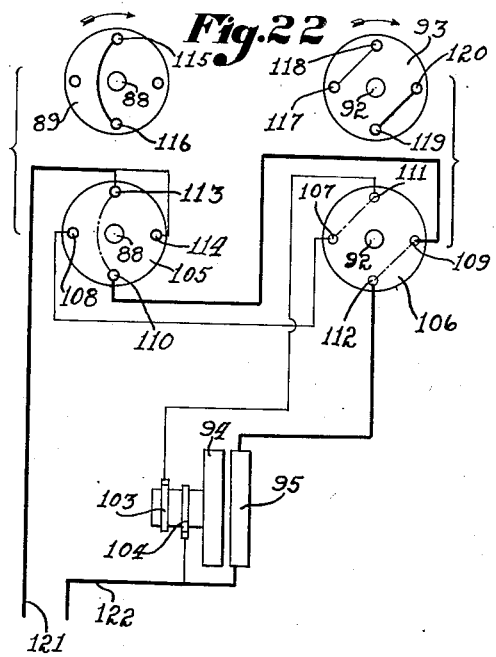
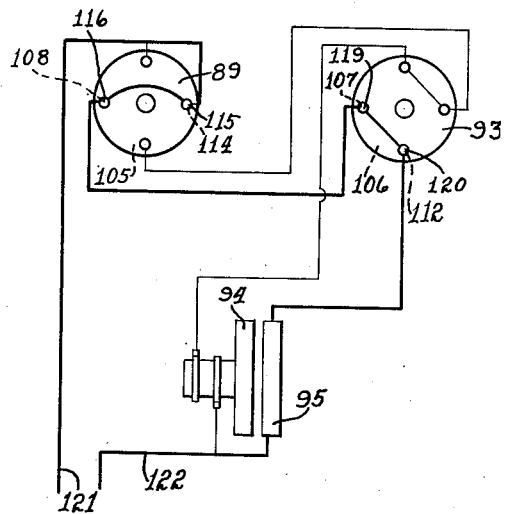
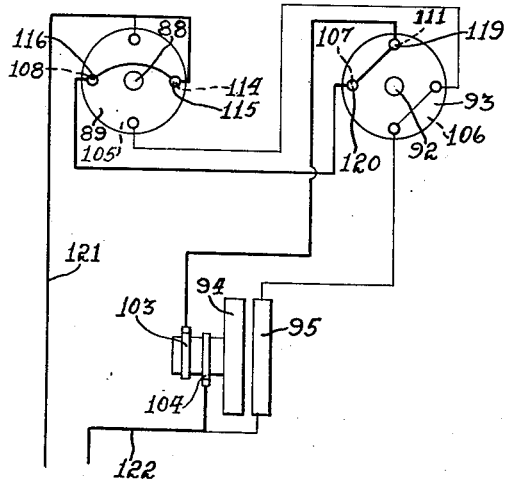
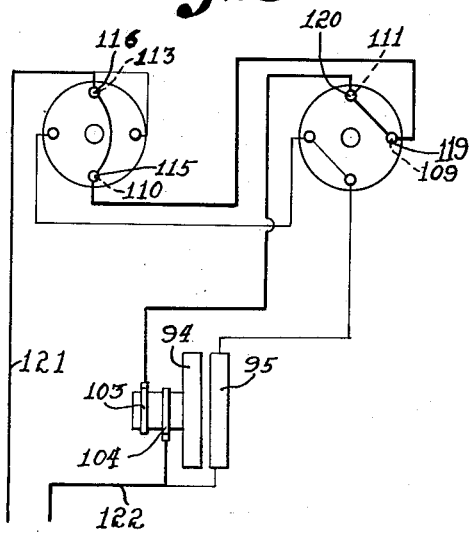
Inventor
George H. Broderick
By Owen & Owen
Attorneys Patented Dec. 20, 1932

1,891,367

UNITED STATES PATENT OFFICE

GEORGE H. BRODERICK, OF MONROE, MICHIGAN, ASSIGNOR TO OTTAWA RIVER PAPER COMPANY, OF TOLEDO, OHIO, A CORPORATION OF OHIO

PAPER BOX MAKING MACHINERY

Application filed November 1, 1930. Serial No. 492,657.

This invention relates to machinery for making boxes from sheet material, such as paper. The paper stock is usually supplied in large rolls or fed direct from the paper making machinery, the boxes being commonly made from sheets of predetermined size, cut from a web composed of a top and a bottom liner with a filler of corrugated paper or strawboard glued therebetween.
The general object of the invention is to provide machinery which will reduce to a minimum the time required and the expense involved in making such boxes. One important feature of the invention is that the several plies of paper or similar material are fed into the machine, assembled, glued, cut off, trimmed, scored and formed into boxes, all by a continuous process. After placing the rolls of stock in position, no handling is required until the boxes are delivered, either tied in bundles or ready to be tied in bundles. In addition to improvements in various units of the assembled machinery, the successful operation depends to a large extent upon the synchronizing of the cut-off mechanism with the travel of the web, so that all of the blanks are cut exactly to the size desired.

The invention, in its preferred form, together with its mode of operation will be more particularly described in connection with the accompanying drawings, in which Figure 1 is a side elevation of the machinery for producing the multi-ply web from which the boxes are made.
Figure 2 is a side elevation of the machinery connected to the delivery end of the machinery shown in Figure 1 and includes means for successively cutting off the blanks, creasing, scoring, slotting, folding and gluing the same to form boxes.

Figure 3 is a plan view of the work as it passes through the machinery shown in Figure 1.

Figure 4 shows the condition of the work at successive points during its progress through the machinery shown in Figure 2.

Figure 5 is an enlarged side elevation of the cut-off machine.

Figure 6 is a transverse section taken near the righthand end of Figure 5.

Figure 7 is a side elevation of the cut-off machine as viewed from the side opposite to Figure 5.

Figure 17 is an enlarged detail view of a star wheel intermittently actuated by the cut-off and slotting mechanism to control its operation.

Figure 18 is an axial sectional view of the distributor which is actuated by the star wheel on the cut-off mechanism.

Figure 19 is a detail view of the rotor shown in Figure 18, which is controlled by the machine shown in Figure 5.

Figure 20 is a section taken on the line 20—20 of Figure 18.

Figure 21 is a detail view of the rotor which is controlled by the machine shown in Figure 8.

Figure 22 is a wiring diagram of the circuits controlling the magnetic clutch and brake, showing the rotors of the distributors in position to hold the cut-off mechanism stationary.

Figures 23, 24 and 25 are similar wiring diagrams illustrating successive positions of the rotors.

Figure 8:
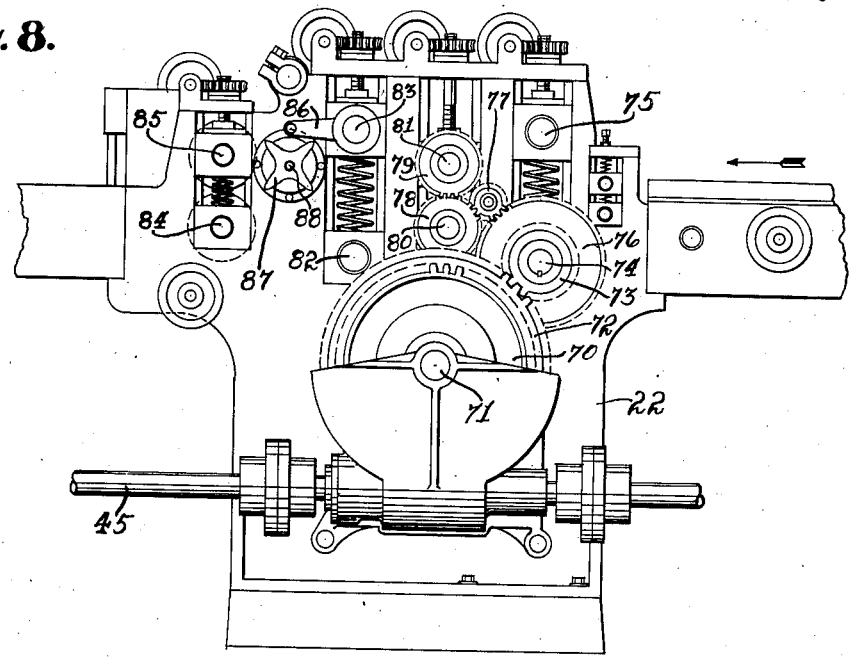
Figure 8 is an enlarged side elevation of the creasing, scoring, and slotting machine.

In the machinery shown in Figure 1 the bottom liner 1, the filler 2 and the top liner 3 are supplied from the respective rolls 4, 5 and 6, while the rolls 7, 8 and 9 are held in reserve ready to be used when the rolls 4, 5 and 6 are exhausted. The webs 1, 2 and 3 first pass through the trimming rolls 10. The filler web 2 then passes through the corrugating rolls 11 and over a gluing roll 12. The bottom liner, as it leaves the trimming rolls, passes about the rolls 13, 14 and 15 and as the webs 1 and 2 pass between the rolls 16 glue is applied to the upper surface of the web 2. The top liner 3 passes about the roll 17 and the 3-ply web is formed as it passes between the rolls 18. This web then passes through a heat treating unit 19 where the glue is dried and the web subsequently cooled, so that as it leaves the unit 19, it is ready to be cut into suitable lengths and formed into boxes.

As shown in Figure 3, the several plies 1, 2 and 3 are so trimmed and assembled that the bottom liner projects at one side beyond the edge of the filler, while the top liner projects at the opposite side beyond the edge of the filler. When the web is subsequently cut into blanks and folded to form boxes, the edges of the filler sheet are brought into abutting relation while the extended edges of the liners overlap the adjacent edges of the blank, thus forming a secure bond with the meeting portions of the blank substantially in the same plane.

As the web passes through the cut-off unit 20, it is cut into blanks 21 of a predetermined length. These blanks then pass through the machine 22 where they are successively creased, scored, slotted, and the flaps covered with glue as indicated at 23, 24, 25 and 26 respectively. The blanks then pass through the folding machine 27, where they are progressively folded and glued as indicated at 28, 29, 30 and 31 respectively. The complete folded boxes 31 may then be passed through a printing machine 32, whence they are delivered to a table and stacked as indicated at 33, or they may be delivered to a counting and tying machine.

All of the machinery, as illustrated in the drawings, is driven through a main power shaft 34. The progress of the work through the successive machines leading up to the cut-off unit 20 is effected by a line of shafting 35 which is adapted to be constantly driven from the shaft 34 by a variable speed connection which includes a belt 36 passing over cones 37. The relative positions of the cones 37 are shifted to increase or decrease the speed of rotation of the shafting 35 by shifting the levers 38 which are connected to the respective cones 37. It will be readily understood that the levers 38 are intermediately fulcrumed on the frame 39 and having oppositely threaded connections with a spindle 40 which may be rotated in one direction or other by means hereinafter described to increase or decrease the speed of travel of the stock through the machine as desired.

Figure 9:
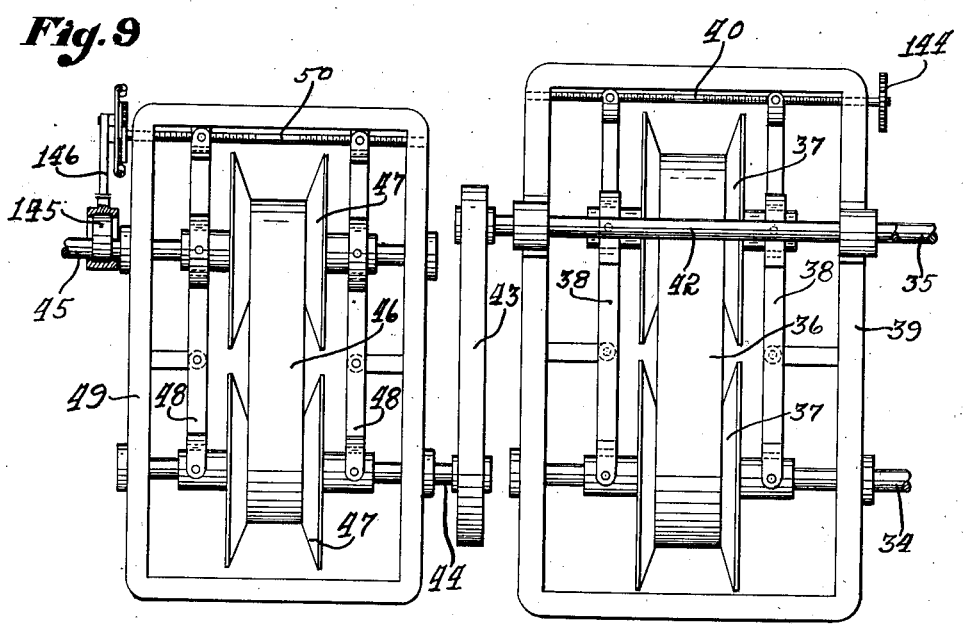
Figure 9 is a plan view of the variable speed driving connection between the main power shaft and the machines shown in Figures 8 and 7 respectively.
Figure 14:
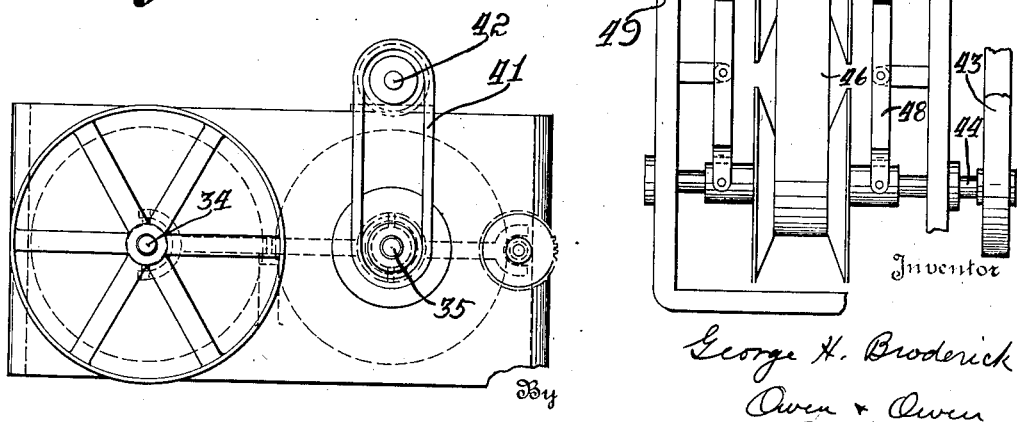
Figure 14 is a side elevation of the main driving connection.

As shown in Figures 9 and 14, the line shaft 35 has a driving connection 41 with a counter shaft 42 which has a driving connection 43 with a shaft 44. The shaft 44 has a variable speed connection with the shaft 45, by the proper control of which the timing of the cut-off operation is synchronized with the travel of the stock through the machine so that each sheet will be cut to the proper length. This last mentioned variable speed connection includes a belt 46 which passes about cones 47 splined on the shafts 44 and 45 respectively. The relative positions of these cones are controlled by levers 48 intermediately fulcrumed on the frame 49 and having oppositely threaded connections with a spindle 50 which is adapted to be rotated in either direction by means hereinafter described, as may be necessary to correct the timing of the cut-off mechanism.

The shaft 35 has a direct driving connection with all of the mechanism leading up to the cut-off machine 20 and also is adapted to drive a worm gear 52 secured to a shaft 51 mounted in the frame of the cut-off mechanism 20. A gear 53 also secured to the shaft 51 drives a pinion 54 which is secured to a shaft 55. An eccentric gear 56 is secured to the shaft 55 and meshes with an eccentric gear 57 secured to a shaft 58 which carries the cut-off roll 59. The cut-off roll 59 carries a knife 60 which, at each revolution of the roll, cooperates with a bed roll 61 to sever the sheet transversely. The eccentric gears 56 and 57 are so located with respect to the knife 60 that while the shaft 51 rotates at constant speed the knife as it meets the web will be traveling at the same speed as the latter, and as it leaves the web its speed will decrease until the rotation of the shaft 51 is stopped by means hereinafter described, with the knife substantially in its uppermost position.

The web as it is fed to the cut-off mechanism passes over a roll 62 which has a driving connection 63 with the machine 19 and also a connection with the roll 61. As the cut-off blank leaves the cut-off machine it passes between a feed roll 65, on shaft 67, and a pressure roll 66. It is then carried forward by a conveyor 64, the return lap of which passes about a roll 68 which drives shaft 67 by means of a suitable connection 69.

The creasing, scoring and slotting machine 22 is adapted to be continuously driven from the shaft 45 through the medium of a worm gear 70 secured to a shaft 71. A gear 72 also secured to the shaft 71 meshes with a pinion 73 which is secured to the shaft 74 of the creasing roll. A suitable pressure roll 75 cooperates with the creasing roll. A gear 76 secured to the shaft 74 drives an idler 77 which drives gears 78 and 79 secured to the respective shafts 80 and 81 of the scoring rolls. The gear 72 also drives the slotting rolls 82 and 83 and the gluing rolls 84 and 85.

The coordination between the operation of the machine 22 and the cut-off machine 20 is controlled in part by an arm 86 secured to the slotting roll 83 and adapted at each revolution thereof to engage a star wheel 87 secured to a shaft 88 and to advance the latter through an arc of 90°. Secured to the shaft 88 is the rotor 89 of a distributor switch.

The timing of the operation of the cut-off mechanism is also in part controlled by an arm 90 secured to the shaft 58 of the cut-off roll and adapted at each revolution of the latter to engage a star wheel 91 secured to a shaft 92 and to advance the latter 90°. The rotor 93 of another distributor switch is secured to the shaft 92.

The circuits controlled by the above mentioned distributor switches act upon the magnetic clutch which includes a member 94 secured to the shaft 35 and a member 95 secured to a stationary part of the machine. Spring held armatures 96 and 97 are mounted between the members 94 and 95 and are connected to a collar 98 which is secured to a sleeve 99 surrounding the shaft 45. The sleeve 99 has an interlocking connection with the worm 100 which meshes with the worm gear 52. If the armature 96 is engaged with the member 94 which rotates with the shaft 35; then the sleeve 99 and worm 100 will rotate with the shaft 35 and drive the cut-off mechanism. If, however, the armature 97 is engaged with the member 95 the sleeve 99 must remain stationary and the cut-off mechanism will also remain stationary. It will be understood that the armature 96 is engaged with the member 94 when the coil 101 is energized and the armature 97 is engaged with the stationary member 95 when the coil 102 is energized. Connections with opposite terminals of the coil 101 are made through rings 103 and 104 which are secured to the member 94.

The successive intermittent operations of the cut-off mechanism as controlled by the star wheels 87 and 91 and the magnetic clutch 94, 95 will be described in connection with the wiring diagrams in Figures 22 to 25 inclusive. The rotor 89 is mounted adjacent the stator 105 and the rotor 93 is mounted adjacent the stator 106. A terminal 107 in the stator 106 is electrically connected to a terminal 108 in the stator 105. A terminal 109 in the stator 106 is electrically connected to a terminal 110 in the stator 105. Terminals 111 and 112 in the stator 106 are electrically connected respectively with the coils controlling the armatures to the clutch members 94 and 95 and are connected thence with one of the line wires 122. The terminals 113 and 114 of the stator 105 are connected to the line wire 121. The terminals 115 and 116 on the rotor 89 are electrically connected to each other. The terminal 117 on the rotor 93 is electrically connected to the terminal 118, and the terminal 119 is connected to the terminal 120.

Figure 13:
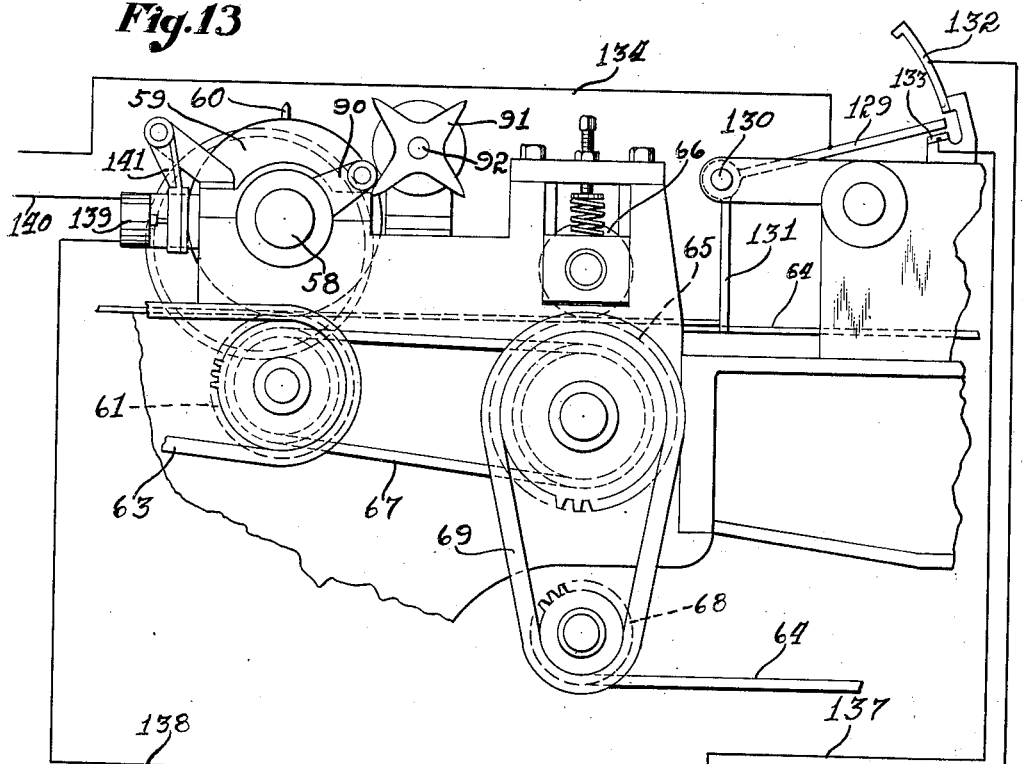
Figure 13 is an enlarged side elevation of the cut-off machine and the device for synchronizing the same, together with the circuits for controlling the latter.

Assuming that the cut-off mechanism has just completed a cutting operation and that it has come to rest in the position shown in Figures 5, 7 and 13 while the web continues to travel and the machine 22 continues to be driven from the shaft 45, and that the distributors are in the position shown in Figure 22, current will pass from the line 121 through the terminals 113, 110, 109 and 112 and thence through the coil of the stationary clutch member 95 to the line 122. Thus the armature 97 and the collar 98 will be held motionless, as will the cutting mechanism in the machine 20. As soon as the arm 86 in the machine 22, however, has completed the next revolution and engages the star wheel 87 the rotor 89 will be turned to the position shown in Figure 23, thus establishing a circuit from the line 121 through the terminals 114, 108, 107 and 111, and through the coil of the rotatable clutch member 94 to the line 122. The cut-off mechanism will now begin to rotate and will complete one revolution before the machine 22 has operated long enough to again actuate the star wheel 87. The completion of the revolution of the cut-off knife 60 will cause the actuation of the star wheel 91 by the arm 90 and will turn the rotor 93 to the position shown in Figure 24. At this point the circuit through the coil of the rotatable clutch member 94 will have been interrupted and a circuit will be established from the line 121 through the terminals 114, 108, 107 and 112 and through the coil of the stationary clutch member 95 to the line 122. The cut-off member will then come to rest and will remain at rest until its movement is again initiated after a predetermined operation of the machine 22, or in other words, after a predetermined forward travel of the web corresponding to the length of a sheet to be cut. At this point the arm 86 will again engage the star wheel 87 to turn the rotor 89 to the position indicated in Figure 25. In this position a circuit will be established from the line 121 through terminals 113, 110, 109 and 111 and through the coil of the rotatable clutch member 94 to the line 122. Thus the cut-off knife will be again rotated until, at the completion of one revolution, it comes to rest as before. This cycle of operation will continue to be repeated as long as the operation of the machinery is continued. As shown in Figure 20, each rotor may be stopped and yieldably held at the end of each movement by the engagement of a spring arm 123 in a notch 124.

Figure 12:
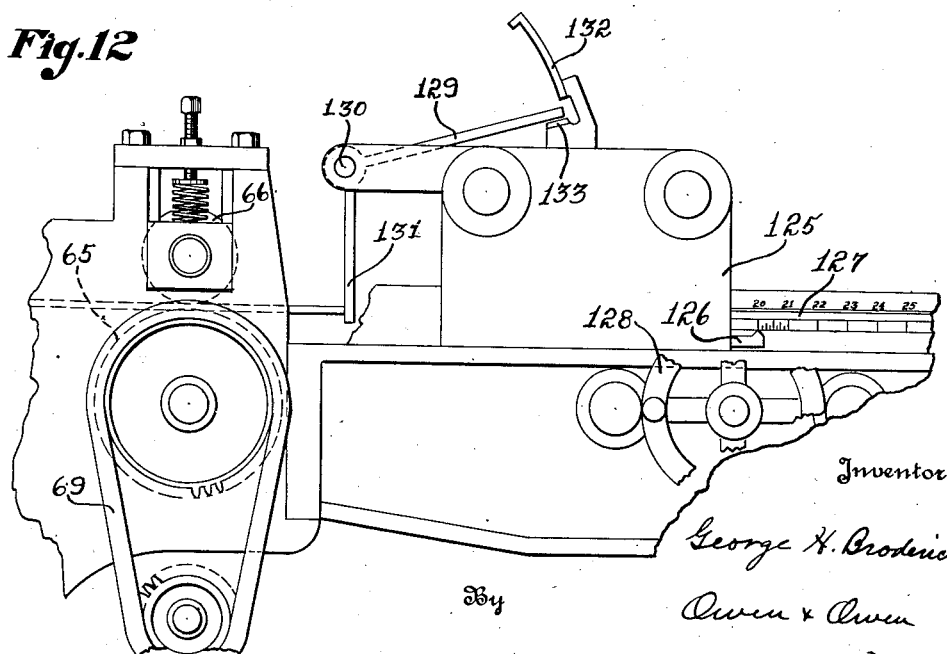
Figure 12 is a side elevation of the gauge for determining the length of the sheet cut off, together with the switch for controlling the synchronizing device.

The length of the sheet to be cut off is determined by a gauge 125 which, as shown in Figure 12, is provided with a pointer 126 adapted to cooperate with a scale 127. The gauge 125 is adjusted longitudinally by means of a hand-wheel 128. When a change is made in the length of the sheet to be cut off, the timing of the operation of the cut-off knife 60 with relation to the travel of the web must also be changed and this change is effected by the requisite change in the ratio of the driving connection between the shaft 44 and the shaft 45. This changeable speed connection also permits an automatic increase or decrease in the relative speed of the feeding mechanism to correct the synchronization of the cutter in case the sheet is cut too short or too long.

One means by which the synchronization of the cut-off mechanism may be effected, as well as an automatic change in the timing of the cut-off mechanism corresponding to a change in the position of the gauge 125, is illustrated in Figures 12 and 13. This includes a circuit closer 129 which is pivoted at 130 and has an arm 131 normally extending into the path of the sheets. As the cut off blank passes into the machine 22, it travels faster than the web which is advancing through the machine 20, leaving a gap between the rear end of the blank and the end of the web from which it has been cut. The latter, as it advances, engages the arm 131. If the arm 129 swings upwardly from the position shown in Figure 13 it makes contact with the conductor 132 and if it swings downwardly it makes contact with the conductor 133. In the first position, a circuit is completed from the line 134 through arm 129, contact member 132 and wire 135 to a motor 136 to drive the latter in one direction. In the other extreme position of arm 129, a circuit is completed though line 134, arm 129, contact member 133 and wire 137 to the motor 136 in a manner to drive the latter in a reverse direction. The return current from the motor 136 is through a wire 138 and push button switch 139 to line 140. The push button switch 139 is normally open so that the motor 136 is not normally energized by the travel of the sheet beneath the arm 131 as long as the cut-off device is synchronized with the other machinery. As the arm 90 rotates with the knife 60, however, it momentarily engages the end of a spring held arm 141 to close the push button switch 139. If, at the time the push button switch 139 is closed, the arm 129 is in neutral position with the end of the sheet against the depending arm 131, there will be no circuit through the motor 136. But if the sheet is cut too long the arm 129 will have been moved upwardly into engagement with the contact member 132, at the time the push button switch is closed and the motor 136 will be momentarily energized to rotate the spindle 50 through the medium of gears 142 and 143 in a direction to speed up the finishing mechanism which is driven by shaft 45. On the other hand, if the sheet had been cut too short, the arm 129 will still rest against the contact member 133, when the push button switch 139 is closed. The motor 136 will then be rotated to rotate the spindle 50 in a direction to slow down the finishing mechanism, which is driven by shaft 45.

The ratio of the driving connection 36, 37 between the main power shaft 34 and the line shaft 35 through which all of the machinery is driven, determines the speed at which all of the machinery operates. The limit of such speed depends only upon how fast the boxes may be taken care of. This speed may, of course, be increased or decreased by a rotation of the spindle 40, which is effected through a gear 144 rotated by hand or by means of a remote push button control.

Figure 10:
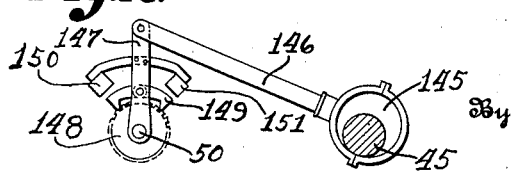
Figure 10 is a detail view of the synchronizing device shown in connection with the variable speed drive in the lefthand part of Figure 9.
Figure 11:
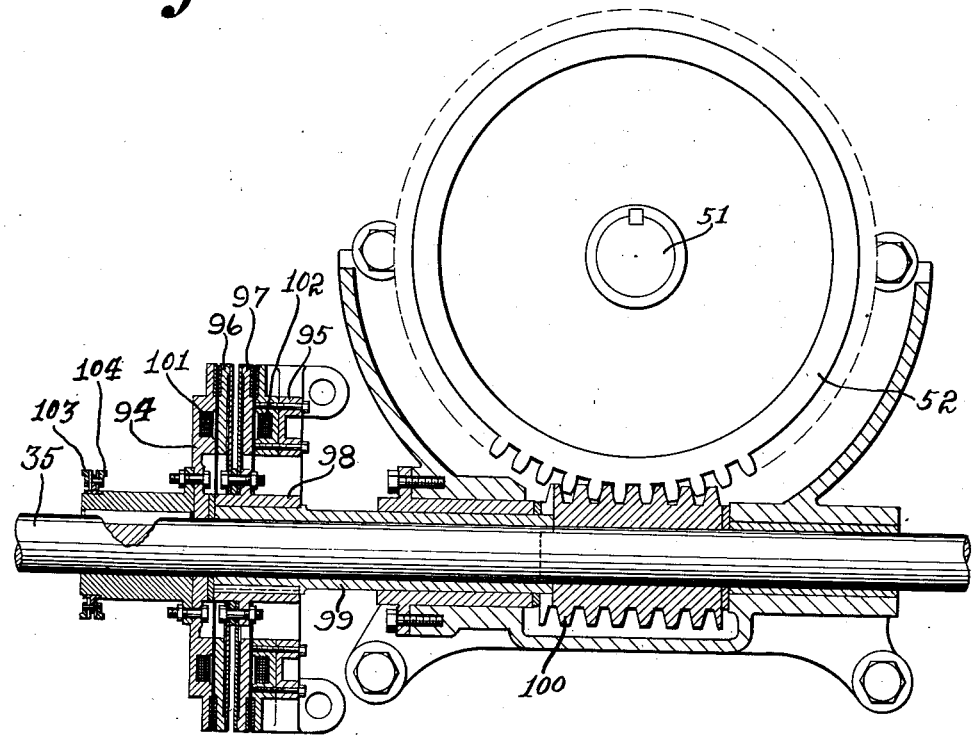
Figure 11 is a detail sectional view of the driving mechanism for the cut-off machine, together with the magnetic clutch and brake for controlling the same.

In Figures 9 and 10 there is shown a synchronizing device of modified form for varying the speed of rotation of the shaft 45 with respect to the shaft 44. In this construction, an eccentric 145 is secured to the shaft 45 and on this eccentric is mounted a pitman 146 which is connected to the end of a lever 147 journaled on the spindle 50. A ratchet wheel 148 is secured to the spindle 50 and is adapted to be actuated step by step in either direction by a double pawl 149 which is centrally pivoted to the lever. A solenoid 150, carried by the lever 147, is adapted, when energized, to rock the pawl 149 in one direction and a second solenoid 151, also carried by the lever 147, is adapted, when energized, to rock the pawl in the opposite direction. When these solenoids are substituted in the respective circuits 135 and 137 for the reversible motor 136, the spindle 50 may be rotated to synchronize the operation of the cut-off knife 60 in substantially the same manner as when actuated through the gears 142 and 143.

Figure 15:
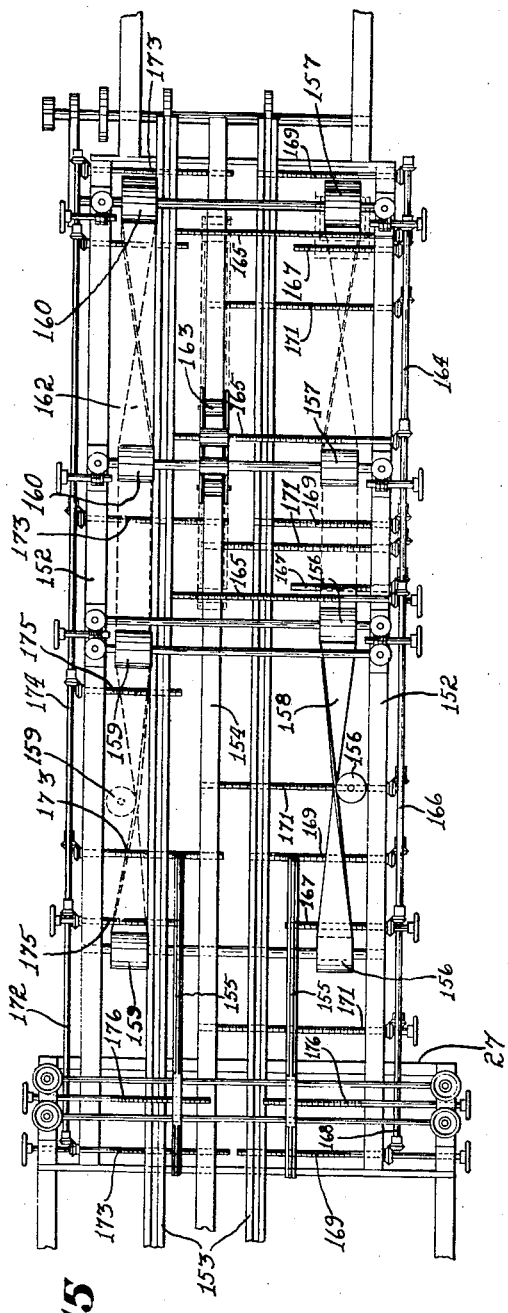
Figure 15 is a plan view of the folding machine.
Figure 16:
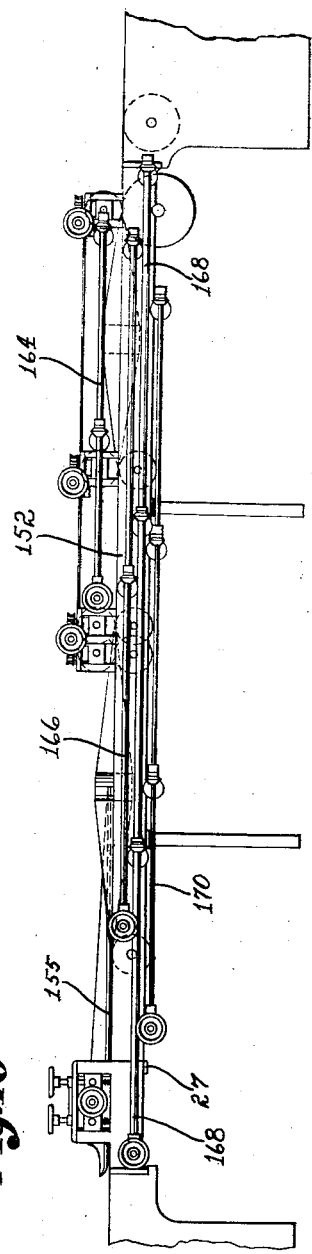
Figure 16 is a side elevation of the folding machine.

The folding machine 27, as illustrated in Figures 15 and 16 comprises longitudinal beams 152 between which are longitudinal channel tracks 153 for guiding the conveyors on which the sheets are carried. Between these channel tracks 153 is an intermediate supporting bar 154. Pressure shoes 155 are also provided, beneath which the sheets are guided. Near the sides of the folding machine there are belt pulleys 156, 157, 159 and 160 adapted to receive folding belts 158 and 162 for folding the sides of the box. Pressure rolls 163 are also provided for pressing down the glued flaps after the box is folded. A rotatable longitudinal shaft 164 is mounted at one side of the machine and is geared to transverse screws 165 for adjusting the pressure rolls 163 laterally. Another rotatable longitudinal shaft 166 is geared to transverse screws 167 for adjusting the belt pulleys 156 and 157. Another longitudinal rotatable shaft 168 is geared to transverse screws 169 for adjusting one of the conveyor tracks 153. Another longitudinal rotatable shaft 170 is geared to transverse screws 171 for laterally adjusting the center bar 154. On the other side of the machine a longitudinal rotatable shaft 172 is geared to transverse screws 173 for adjusting the other channel track 153. Another longitudinal rotatable shaft 174 is geared to transverse screws 175 for transversely adjusting the belt pulleys 159 and 160. Transverse screws 176 are also provided for laterally adjusting the shoes 155. Thus it will be seen that provision is made for adjusting all the elements of the folding machine to accommodate sheets for making boxes of any size.

While I have shown and described in considerable detail a complete plant for making paper boxes by a continuous process, it is apparent that various units thereof may be removed or replaced by others of modified construction without any material departure from the scope of the invention as claimed.

What I claim is:

1. In box making machinery, means for continuously feeding a web of sheet material, an intermittently operable mechanism for cutting blanks from the traveling web, a train of continuously driven mechanism acting on the cut blanks and operable periodically to trip the cutting mechanism, and means to adjust the timing of the cut-off mechanism to cut blanks of a desired length.

2. In machinery of the class described, means for continuously advancing a web of sheet material, cut-off mechanism intermittently operable through a predetermined cycle to cut said web into blanks, means for performing work on said blanks as they are delivered from the cut-off mechanism, a variable speed connection between said work performing means and the first mentioned means, and a synchronizing device for acting on said variable speed connection to synchronize the cut off mechanism with the work performing mechanism and controlled by the cut end of the web.

3. In machinery of the class described, means for feeding a web of sheet material, intermittently operable means for cutting the web into blanks, means for performing work on said blanks as they are delivered from the cutter, means periodically actuated by said work performing means to initiate the operation of the cutter, and means cooperating with the cut end of the web for adjusting the speed ratio between said feeding means and said work performing means to control the length of the blank to be cut.

4. In machinery of the class described, means for feeding a web of sheet material, intermittently operable means for cutting the web into blanks, means for performing work on said blanks as they are delivered from the cutter, means periodically actuated by said work performing means to initiate the operation of the cutter, a gauge, and means cooperating with the cut end of the web for automatically adjusting the speed ratio between said feeding means and said work performing means in accordance with the setting of said gauge to control the length of the blank to be cut.

5. In machinery of the class described, means for feeding a web of sheet material, intermittently operable means for cutting the web into blanks, means for performing work on said blanks as they are delivered from the cutter, a gauge, and means cooperating with the cut end of the web to synchronize the speed of said feeding means and cut-off mechanism with the said work performing means in accordance with the setting of said gauge.

6. In machinery of the class described, intermittently operable means for cutting a continuously moving web of sheet material into blanks, means for performing work on a blank as it is delivered, and means periodically actuated by said work performing means to initiate the operation of said cutting means.

7. In machinery of the class described, means for continuously feeding a web of sheet material, intermittently operable means for cutting the web into blanks, means for performing work on said blanks as they are delivered from the cutter, means periodically actuated by said work performing means to initiate the operation of the cutter, and means for synchronizing said feeding and cutting means with the work performing means in accordance with the length of the blanks desired.

8. In machinery of the class described, means for feeding a web of sheet material, an intermittently operable cut-off mechanism for cutting the web into blanks, means for subsequently performing work on said blanks, a magnetic clutch for operatively connecting the cut-off mechanism to the web feeding means, means actuated periodically by said work performing means and operable through said clutch to drive the cut-off mechanism, and means actuated by the cut-off mechanism at the completion of its cycle and operable through said clutch to stop the cut-off mechanism.

9. In machinery of the class described, means for feeding a web of sheet material, an intermittently operable cut-off mechanism for cutting the web into blanks, means for subsequently performing work on said blanks, a magnetic clutch for operatively connecting the cut-off mechanism to the web feeding means, means actuated periodically by said work performing means and operable through said clutch to drive the cut-off mechanism, and means for changing the speed ratio between the web feeding means and said work performing means to change the length of a blank to be cut.

10. In machinery of the class described, means for feeding a web of sheet material, an intermittently operable cut-off mechanism for cutting the web into blanks, means for subsequently performing work on said blanks, an adjustable speed connection between the said feeding means and said work performing means, a magnetic clutch for operatively connecting the cut-off mechanism to said web feeding means, means actuated periodically by said work performing means and operable through said clutch to drive the cut-off mechanism, and means actuated by the cut-off mechanism at the completion of its cycle and operable through said clutch to stop the cut-off mechanism.

11. In machinery of the class described, means for feeding a web of sheet material, an intermittently operable cut-off mechanism for cutting the web into blanks, means for subsequently performing work on said blanks, an adjustable speed connection between the said feeding means and said work performing means, a magnetic clutch for operatively connecting the cut-off mechanism to said web feeding means, means actuated periodically by said work performing means and operable through said clutch to drive the cut-off mechanism, and means controlled by the cut blank to change said adjustable speed connection to synchronize said web feeding means and cut-off mechanism with said work performing means in accordance with the length of the desired blank.

12. In machinery of the class described, a main drive shaft, a secondary drive shaft, a variable speed connection between the two shafts, mechanism intermittently driven from one of said shafts, means constantly driven from the other of said shafts to trip the intermittently driven mechanism periodically into operation and means dependent upon the timing of said intermittently driven mechanism to synchronize the speed of said shafts.

13. In the machinery of the class described, a main drive shaft, a secondary drive shaft, a variable speed connection between the two shafts, a gauge adjustable to change the relative speed of the two shafts, mechanism intermittently driven from one of said shafts, means constantly driven from the other of said shafts to trip the intermittently driven mechanism periodically into operation and means dependent upon the setting of said gauge to synchronize the speed of said shafts.

14. In box making machinery, means for continuously feeding a web of sheet material, an intermittently operable mechanism for cutting blanks from the travelling web, a train of continuously driven mechanism acting on the cut blanks and operable periodically to trip the cutting mechanism, and means to automatically vary the relative speed of said train of mechanism to correct any error in the length of the cut blanks.

15. In box making machinery, means for continuously feeding a web of sheet material, an intermittently operable mechanism for cutting blanks from the travelling web, a train of continuously driven mechanism acting on the cut blanks and operable periodically to trip the cutting mechanism, an adjustable gauge for determining the length of the cut blanks, and means to automatically vary the relative speed of said train of mechanism to accord with a change in the setting of the gauge.

16. In box making machinery, means for assembling a multi-ply web, means for cutting off blanks of predetermined size from said web as it is delivered from the assembling means, means for creasing and scoring said blanks as they are delivered from the cut-off means, means for then forming the blanks into boxes, and means cooperating with the cut end of the web for synchronizing said cut-off means with the creasing and scoring means in accordance with the length of the desired blanks.

17. In box making machinery, mechanism for cutting blanks from a continuously travelling web, mechanism for creasing and scoring said blanks after they are thus cut, and means cooperating with the cut end of the web for synchronizing the action of the cut-off mechanism and the creasing and scoring mechanism with the travel of the web in accordance with the length of the desired blanks.

18. In box making machinery, means for continuously feeding a web of sheet material, intermittently operable mechanisms for cutting blanks from said web as it is fed and for creasing and scoring said blanks and forming them into boxes without intermediate handling, and automatic means cooperating with the cut end of the web to synchronize the operation of the cut-off mechanism and the creasing and scoring mechanism in accordance with the length of the desired blanks.

19. In box making machinery, mechanisms for cutting blanks from a continuously travelling web, for creasing and scoring said blanks and for making the same into boxes without intermediate handling, means for simultaneously increasing or decreasing the speed of all of said mechanisms in equal proportions, and means cooperating with the cut end of the web for increasing or decreasing the relative speed of the cut-off mechanism with reference to the creasing and scoring mechanism in accordance with the length of the desired blanks.

In testimony whereof I have hereunto signed my name to this specification.

GEORGE H. BRODERICK.